(12) United States Patent
Handy

(10) Patent No.: US 9,499,417 B1
(45) Date of Patent: Nov. 22, 2016

(54) ADJUSTABLE WATER SOFTENER WITH CLOSED-PRESSURE AERATION

(71) Applicant: Scott R Handy, Hagerstown, MD (US)

(72) Inventor: Scott R Handy, Hagerstown, MD (US)

(*) Notice: Subject to any disclaimer, the term of this patent is extended or adjusted under 35 U.S.C. 154(b) by 0 days.

(21) Appl. No.: 15/256,704

(22) Filed: Sep. 5, 2016

Related U.S. Application Data (63) Continuation-in-part of application No. 13/624,895, filed on Sep. 22, 2012, now Pat. No. 9,434,626.

(51) Int. Cl.
| | | |
|---|---|---|
| C02F 1/42 | (2006.01) | |
| C02F 1/00 | (2006.01) | |
| C02F 5/02 | (2006.01) | |
| C02F 101/10 | (2006.01) | |
| C02F 101/20 | (2006.01) | |

(52) U.S. Cl.
CPC ............ *C02F 1/42* (2013.01); *C02F 1/008* (2013.01); *C02F 5/025* (2013.01); *C02F 2001/425* (2013.01); *C02F 2101/101* (2013.01); *C02F 2101/203* (2013.01); *C02F 2303/02* (2013.01)

(58) Field of Classification Search
None
See application file for complete search history.

(56) References Cited

U.S. PATENT DOCUMENTS

| | | | |
|---|---|---|---|
| 511,757 A | 1/1894 | Criqui | |
| 1,272,052 A | 7/1918 | Kennicott | |
| 2,711,456 A | 6/1955 | Sanborn | |
| 2,919,147 A | 12/1959 | Nenzell | |
| 3,649,532 A | 3/1972 | Mclean | |
| 3,786,829 A | 1/1974 | Nardo et al. | |
| 4,966,692 A | 10/1990 | Overy | |
| 5,354,459 A * | 10/1994 | Smith | C02F 1/20 210/170.07 |
| 6,325,943 B1 * | 12/2001 | Kohlenberg | C02F 1/281 137/14 |
| 6,436,293 B1 * | 8/2002 | Carli | A47L 15/4231 210/661 |
| 6,444,127 B1 | 9/2002 | Vaughan | |
| 6,481,456 B1 | 11/2002 | Falkner | |
| 6,627,070 B1 * | 9/2003 | Frank | C02F 1/74 210/120 |
| 7,285,220 B2 * | 10/2007 | Jeong | B01J 49/0008 210/190 |

* cited by examiner

*Primary Examiner* — Terry Cecil (74) *Attorney, Agent, or Firm* — Larry J. Guffey (57) ABSTRACT

A water conditioning system that both softens and improves the smell of water by removing dissolved ferrous iron and hydrogen sulfide from the water includes: a water softening tank, a cation exchange media situated in the water softening tank, a brine tank, a programmable control valve which regulates flow through the system and the periodic rejuvenation of the cation exchange media using flow from the brine tank, a valve that assists in providing a flow of aerated, pressurized water to the system, and an adapter with a bottom portion and a flow control valve that control the volume of the gaseous pocket that is created in the top portion of the water softening tank.

9 Claims, 4 Drawing Sheets

ADJUSTABLE WATER SOFTENER WITH CLOSED-PRESSURE AERATION

CROSS-REFERENCE TO RELATED APPLICATION

This is a Continuation-In-Part application and claims the benefit of U.S. patent application Ser. No. 13/624,895, filed Sep. 22, 2012, and which issued as U.S. Pat. No. 9,434,626 on Sep. 6, 2016, by the present inventor, which is a continuation-in-part of U.S. patent application Ser. No. 12/659,085, filed Feb. 24, 2010, now abandoned. The teachings of this earlier application and patent are incorporated herein by reference to the extent that they do not conflict with the teachings herein.

BACKGROUND OF THE INVENTION

1. Field of the Invention

The present invention relates generally to apparatus for liquid purification or separation with means to add a treating material. More particularly, the present invention relates to a method for cleaning contaminated water using ion exchange media.

2. Description of the Related Art

Water's hardness is determined by its concentration of multivalent cations (i.e., positively charged metal complexes with a charge greater than 1+). The hardness of water is typically classified into two types: soft and hard. Surface water, such as rainwater, is classified as soft water and considered to be relatively free of multivalent cations. By contrast, well water and ground water is classified as hard water because it is often found to have significant concentrations of calcium ions ($Ca^{2+}$) and magnesium ions ($Mg^{2+}$). These ions enter a water supply by leaching from minerals within an aquifer.

Hard water is generally not harmful to one's health, but can pose serious problems in industrial settings, where water hardness is monitored to avoid costly breakdowns in boilers, cooling towers, and other equipment that handles water. In domestic settings, hard water is often indicated by a lack of suds formation when soap is agitated in water. Wherever water hardness is a concern, water softening is commonly used to reduce hard water's adverse effects.

To resolve water hardness problems, water softeners are widely used. For this softening function, a water softener typically includes essentially a water softening tank, a regeneration tank and the necessary plumbing and control valves to control the flow of water between these tanks. The water softening tank is filled with an ion exchange resin of a particular polymer compound with sodium ions that are reduced by continuous contact with raw hard water. Thus, when water softening is carried out for a long period, the concentration of sodium ions in the ion exchange resin is diminished and the resin must consequently be periodically regenerated. The regeneration tank contains a regeneration material for the ion exchange resin, such as salts which release sodium ions when dissolved in water so as to create a brine solution. See, for example, U.S. Pat. Nos. 7,285,220, 6,436,293 and 2,711,465.

The water softening tank and the regeneration tank both have raw water, inflow piping. A piping line connects the upper part of the water softening tank to a lower part of the regeneration tank. A valve in this line is opened to begin a backwashing operation that supplies brine water from the regeneration tank to the water softening tank. After the resin has been sufficiently rejuvenated, this valve is closed and the brine water is flushed from the water softening tank. Its resin is now again available for use in softening the incoming raw water. A timer and a programmable control valve are often used to control the flow between the tanks and the various phases (softening or back-washing) of the water softener's operation.

Conventional water softeners often have several disadvantages. The regeneration phase of their operation can be time-consuming which can limit their available service time for softening water and yield higher than desired operating costs. They can also be bulky in size which can limit the number of places where they might be installed in a residence.

Well water, particularly water drawn from "deep" wells (i.e., below thirty feet), may also contain significant quantities of soluble gases, such as hydrogen sulfide ($H_2S$) which has a distinctive "rotten egg" smell that makes the treatment of $H_2S$-contaminated water desirable.

Water softeners are not effective for removing soluble $H_2S$ from water. Most methods for treating $H_2S$-contaminated water rely on oxidizing $H_2S$ so as to make a solid precipitate that can be filtered from the water. If $H_2S$ concentrations exceed 6 mg/L, oxidation via chlorination is typical. On the other hand, if $H_2S$ concentrations fall below 6 mg/L, oxidation with manganese greensand is more common.

Chlorination is a widely used method for oxidizing $H_2S$. Chlorine is usually added to a supply of water in the form of sodium hypochlorite (NaOCl), liquid bleach. Treated water may, unfortunately, have lingering tastes or odors caused by residual chlorine and byproducts of the reaction between NaOCl and $H_2S$. Therefore, before human consumption, treated water should be passed through an activated carbon filter to remove suspended chlorine and sulfur compounds.

Chlorination systems are available as a pellet-drop unit or a liquid feeder. A pellet-drop unit automatically dispenses a measured amount of NaOCl in solid form into a well casing or into a retention tank during a pumping cycle. A liquid feeder, as the name suggests, delivers NaOCl dissolved in a liquid to an energized well pump.

Manganese greensand carries a coating of manganese oxide ($MnO_2$). During use, $MnO_2$ reacts with $H_2S$ to form solid particles that are captured by the greensand itself. When the $MnO_2$ is depleted, the greensand can be regenerated with potassium permanganate ($KMnO_4$). When greensand is used to treat water with high $H_2S$ concentrations, frequent regeneration is often required.

Catalytic carbon provides an alternative. Essentially, catalytic carbon is activated carbon with a modified surface. Catalytic carbon retains all of the adsorptive properties of activated carbon, but it further exhibits an ability to catalyze chemical reactions. During water treatment, catalytic carbon first adsorbs $H_2S$ and, then, in the presence of dissolved oxygen, converts $H_2S$ into an inert solid.

Aeration is another common treatment for water having dissolved $H_2S$. See, for example, U.S. Pat. Nos. 6,627,070, 6,325,943 and 5,354,459. During aeration, $H_2S$ is removed by agitating water in contact with air in a special mixing or aeration tank. The unwanted $H_2S$ is, after agitating, removed as a gas by venting it with the air from the tank. Aeration is most effective when $H_2S$ concentrations are lower than 2 mg/L. At higher concentrations, aeration may not remove all of the $H_2S$ and supplemental filtration may be necessary.

In a typical aeration system, air is supplied to a mixing tank by a pump or is aspirated into the water with a mixing or aspiration valve. The tank usually maintains a pocket of air in its upper portion of the tank. If the tank does not maintain an air pocket, there may insufficient time for dissolved $H_2S$ to escape and foul odors and tastes may return.

Aeration is not always practical for in-home water treatment, especially if $H_2S$ concentrations exceed 10 mg/L. First, large mixing tanks must be set up in a home to allow air and water to mix for long times. Also, objectionable odors must be vented outside the home. Finally, aerated water may need to be repressurized for distribution within the home.

One's water supply may also contain troubling levels of iron. Making up at least five percent of the earth's crust, iron is one of the earth's most plentiful resources. Rainwater as it infiltrates the soil and underlying geologic formations dissolves iron, causing it to seep into aquifers that serve as sources of groundwater for wells. Although present in drinking water, iron is seldom found at concentrations greater than 10 milligrams per liter (mg/L) or 10 parts per million. However, as little as 0.3 mg/l can cause water to turn a reddish brown color.

Iron is mainly present in water in two forms: either the soluble ferrous iron ($Fe^{+2}$) or the insoluble ferric iron ($Fe^{+3}$). Water containing ferrous iron is clear and colorless because the iron is completely dissolved. When exposed to air in the pressure tank or atmosphere, the water turns cloudy and a reddish brown substance begins to form. This sediment is the oxidized or ferric form of iron that will not dissolve in water.

Iron is not hazardous to health, but it is considered a secondary or aesthetic contaminant. Essential for good health, iron helps transport oxygen in the blood. Most tap water in the United States supplies approximately 5 percent of the dietary requirement for iron.

Dissolved ferrous iron gives water a disagreeable metallic taste. When the iron combines with tea, coffee and other beverages, it produces an inky, black appearance and a harsh, unacceptable taste. Concentrations of iron as low as 0.3 mg/L will leave reddish brown stains on fixtures, tableware and laundry that are very hard to remove.

When iron exists along with certain kinds of bacteria, a smelly biofilm can form. To survive, the bacteria use the iron, leaving behind a reddish brown or yellow slime that can clog plumbing and cause an offensive odor. Iron can also combine with different naturally-occurring organic acids or tannins. Organic iron occurs when iron combines with an organic acid. Water with this type of iron is usually yellow or brown, but may be colorless. As natural organics produced by vegetation, tannins can stain water a tea color.

Ion exchange techniques and various oxidation methods are commonly used to treat water containing ferrous iron. The ion exchange technique involves the use of a water softener's ion exchange resin to also remove low to moderate levels of ferrous iron through the exchange process. This treatment method is reported to have good results when other water quality parameters are within tolerable ranges— including the absence of ferric iron, and the pH level not being so high as to oxidize iron.

Oxidation methods convert soluble ferrous iron into insoluble ferric iron which can then be filtered out using appropriate filtration techniques. Oxidation methods use chlorine, ozone ($O_3$), ambient air, various types of oxidizing filter media or the relatively new technique of electrolytically producing oxygen in the water.

Chlorine for treating ferrous iron can be injected with a chemical feed pump between the well pressure tank and a retention tank. The treated water then is held in the retention tank, where the iron precipitates, some settles and the remainder can then be removed by filtering. A variety of filtration systems can be used, such as oxidizer-treated minerals, manganese greensand, sand and multi-media or catalytic media filters.

Alternately, ozone ($O_3$), which is created by an ozone generator, can be similarly fed into the water stream via a pump or air injector. Another alternative is to introduce significant quantities of air into the water. This is usually achieved by aspirating or pulling air from the surrounding atmosphere into a relatively high speed, water jet stream which is partially exposed to the atmosphere or by using a compressor to inject air into the water flowing through a pipe. A still further alternative is to use manganese greensand as an oxidizing media, which must be periodically rejuvenated by backwashes that utilize potassium permanganate ($KMnO_4$). Yet another alternative is the relatively new technique of electrolytically producing micro-bubbles of pure oxygen from the water itself—this involves having the water flow through a bypass loop which has a unit containing titanium electrodes for generating oxygen microbubbles that are 400 times smaller than standard aeration bubbles.

In light of the problems associated with the hardness and iron- and $H_2S$-contamination of household water supplies and despite the existence of many types of water softeners and means for treating iron- and $H_2S$-contaminated water, there is still a need for improved water treatment systems— e.g., systems that are more compact, require less maintenance, operate more efficiently and have lower investment and operating costs.

SUMMARY OF THE INVENTION

Recognizing the need for the development of improved means or methods to treat iron- and $H_2S$-contaminated water, the present invention is generally directed to satisfying this need.

In accordance with a preferred embodiment of the present invention, a water conditioning system that softens and improves the smell of water by removing dissolved ferrous iron and hydrogen sulfide from the water includes: (a) a water softening tank with a first tank opening that serves as a tank inlet, (b) a cation exchange media situated in this water softening tank, (c) a conduit that is configured to supply aerated, pressurized water through the first tank opening, (d) a brine tank which is configured to hold a brine solution, (e) a programmable control valve which is configured to regulate the flow of water to and from the water softening tank and to allow for the periodic rejuvenation of the cation exchange media using the brine solution, (f) a second opening in the top portion of the water softening tank, (g) an adapter having a passage that is configured to allow for fluid flow through the adapter and with a middle portion which has an outer surface that is configured to connect to and provide a water-tight seal with the tank's second opening, (h) a means configured to connect with the conduit and introduce air into the pressurized water that flows through this means so as to yield pressurized, aerated water flowing downstream from this means, and (i) a gas pressure relief valve configured to attach to an outlet in the top portion of the adapter's passage and operate between an open and a closed position so as to control the maximum allowable gas pressure that may exist in this passage by opening the valve to allow gas to pass through it and into the surrounding environment when a specified maximum allowable gas pressure is exceeded.

This preferred embodiment of the present invention may also be configured such that its adapter's bottom portion has a length that extends its passage inlet downward into the water softening tank to a depth such that the portion of the interior volume of the water softening tank that is above this passage's inlet defines the top portion of the water softening tank and thereby creates an air space in the water softening tank that allows for sufficient mixing of the aerated, pressurized water with the surrounding air in the tank's top portion so as to adequately remove dissolved hydrogen sulfide from the aerated, pressurized water that flows through the system. Furthermore, a preferred length of the adapter's bottom portion is such that the top portion of the water softening tank is in the range of 10%-25% of the water softening tank's total interior volume.

This preferred embodiment of the present invention may also include: (k) a nozzle that is configured to attach to the first tank opening and to cause the aerated, pressurized water to enter the water softening tank as a spray of water droplets whose total surface area is maximized to as to yield in the resulting spray the optimal degassing of the dissolved hydrogen sulfide from the aerated, pressurized water that flow through the system.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 1:
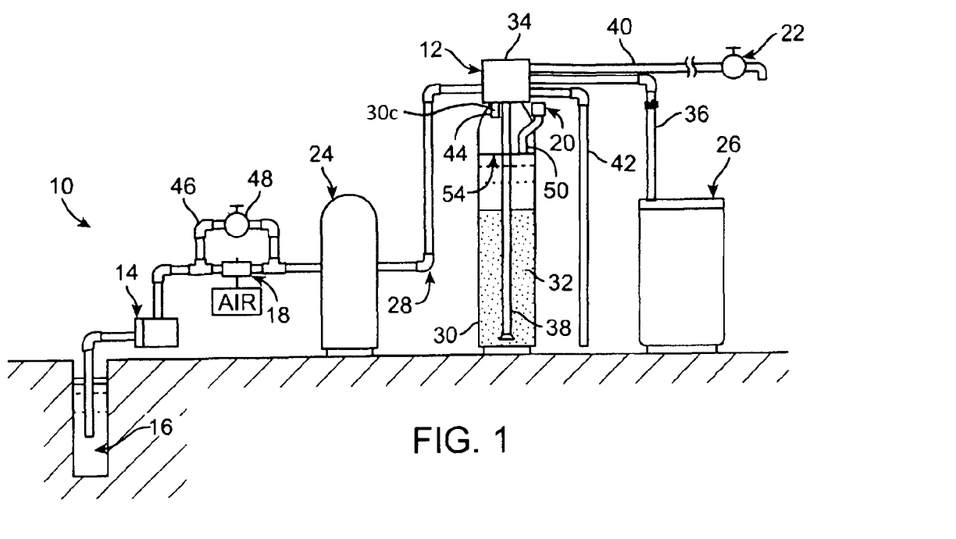
FIG. 1 is a schematic view of a water treatment system incorporating a water softener with closed-pressure aeration in accordance with my invention.

An automated water conditioning system 10 is shown in FIG. 1 which softens and improves the smell of water by removing dissolved hydrogen sulfide ($H_2S$) from the water. This system includes a unique and improved water softener 12. System 10 collects hard water from an $H_2S$-contaminated source, stores the collected water, treats the collected water, and distributes soft water free of $H_2S$ to a user. Soft water, free of $H_2S$, is preferred for human consumption and can be odorless and tasteless.

This system 10 uses a pump 14 to produce water from a well 16 and deliver it, under pressure, into the water softener 12 of the present invention. A means for introducing air into the pressurized water or a snifter or air aspiration valve 18, connected between the pump 14 and the softener 12, admits or aspirates air into the passing water stream so that aerated water is flowing through the system downstream of this valve.

This aeration of the water is important for its beneficial effect of providing the gaseous source into which the dissolved hydrogen sulfide in the water can pass as it comes out of solution as a result of the turbulent mixing that the aerated water experiences as it flows through the system. The percentage of dissolved hydrogen sulfide that is drawn from the aerated water is a function of the concentration of air in the water (i.e., the ratio of the volume of air to the volume of water in the aerated water) and the extent to which this aerated water is mixed (i.e., the amplitude of the mixing and the time period over which this mixing occurs) in the system.

The preferred air aspiration valve (also referred to as a sniffer valve) of the present invention is configured to achieve desired air aspiration rates when the minimum water flow rates through the device or system are in the range 3 to 5 gallons per minute (gpm). A one inch diameter valve (U1020 Adjustable, Air Injector PVC) that is manufactured by The Clack Corporation, Windsor, Wis. has been found to perform satisfactorily in a wide range of residential applications. This valve's adjustability allows one to control the rate at which air is being aspirated into the water and thus the volume flow rate of air to water in the pressurized, aerated water that flows downstream of the valve. The valve's adjustability is achieved by it having two orifices—one that feeds into a Venturi (through which water accelerates as it flows through a restriction section and yields a pressure reduction which is sufficient to cause an effective partial vacuum when this water is exposed to an opening to the ambient air surrounding the valve and causes a sucking, drawing or aspiration of ambient air into the valve 18 where the air is mixed into the passing water stream), and a second orifice that serves as a bypass orifice through which a portion of the flow can be diverted if lower volume ratios of air to water in the aerated water are desired or if the resulting pressure drops through the value are too large when its bypass orifice is fully closed. Because of the pressures drops through such valves, it may be necessary to use them in parallel in the water supply conduit 28 in order to achieve desired flow rates with adequate air aspiration when the well pump 14 that supply them are limited in their ability to impose the necessary higher water pressures at the point where the well water is taken into such a water supply system.

Where water-contaminated $H_2S$ levels are especially high, an air compressor can be substituted for the snifter valve 18 with excellent results. The compressor, however, would likely have more moving parts and would be more likely to break down. The compressor would also require its own power source and would increase the operating cost of system 10. For these reasons, a snifter valve 18 is the preferred means of delivering aerated water to the softener 12.

In some instances, only a portion of the water pressurized by the pump 14 will be directed into the snifter valve 18. If the entire output of the pump 14 is not required to draw sufficient air volumes into the supply conduit 28, a bypass conduit 46 is connected to the supply conduit 28 to divert water around the snifter valve 18. One end of the bypass conduit 46 is connected to the supply conduit 28 upstream of the snifter valve 18 and the other end of the bypass conduit 46 is connected to the supply conduit 28 downstream of the snifter valve 18. Alternately, the snifter valve can have such a bypass feature built into it. A flow valve 48, connected to the bypass conduit 46 between the opposite ends thereof, permits the flow rate of water through the bypass conduit 46 (and, hence, the snifter valve 18) to be controlled with precision.

The aerated water in the conduit 28 is delivered into the well tank 24, for the purpose of storage and to limit the on/off cycling of the pump 14, prior to its delivery into the water softener 12. While standing in the tank 24, gravity induces the water to separate to a degree from the air injected by the snifter valve 18. Water settles to the bottom of tank 24 and air, containing some oxidized $H_2S$, fills the top of the tank 24. Generating the mixing of the water-air interface in this tank can further enhance the levels of dissolved $H_2S$ that are removed from the pressurized water.

Under the influence of gravity and further mixing, air and the released gaseous hydrogen sulfide are separated from the water in the top portion 30a of the tank 30 of the water softener 12. The softener 12 has a valve 20 that vents air and gaseous hydrogen sulfide into the atmosphere when the flow of softened water is such that it drops the water level in the tank sufficient to expose the open bottom end of the downcomer or downcomer pipe 74. The vented air carries away $H_2S$ stripped from the water. Treated water is delivered from the softener 12 to a tap 22 for human consumption.

A well tank 24, upstream of the softener 12, stores water and increases the contact time between air and water thereby increasing the efficiency of the system 10 in removing $H_2S$. A brine tank 26 is also connected to the softener 12 for regeneration purposes.

The pump 14 may be positioned adjacent to the well 16 or positioned within the well 16 and may be energized by any suitable power source. Pump 14 is shown in FIG. 1 to be located on the ground surface. An electrically powered, submersible pump may be an effective substitute, however.

The pump 14 operates intermittently, in response to water demand by a user. Thus, a sensor (not shown) is connected to the well tank 24. The sensor detects a condition where the level of water within the tank 24 falls below a predetermined point or pressure (30-45 psi) and, then, sends an electrical activation signal to the pump 14. In response to the activation signal, the pump 14 is energized and delivers a stream of water from the well 16 to the tank 24. When the water level in the tank 24 exceeds the predetermined level or pressure (50-65 psi), the sensor ceases to send the activation signal thereby shutting down the pump 14.

For the proper operation of this water supply system 10, the pump 14 must have a sufficient pumping capacity and discharge pressure. The present system is configured to operate at minimum water flow rates of 3 to 5 gpm (12 to 19 L/m).

The water softener 12 has a pressurized softener tank 30 with top 30a and bottom 30b portions and contains a cation exchange media 32. This exchange media 32 is positioned in the bottom 30b of the tank 30 and may be any natural or synthetic material capable of softening water. Naturally occurring zeolites were once commonly used in water softeners because of their excellent ion exchange properties and can be used in the water softener 12. Zeolites have, however, been largely replaced by synthetic organic cation resin ion exchangers of polystyrene divinylbenzene (DVB). The water softener 12 preferably uses DVB in the form of small beads as the exchange media 32.

The water softener 12 has a control valve 34 positioned atop the tank 30 for regulating the flow of water into and from the tank 30 through multiple inlets and outlets. A suitable valve 34 for this purpose was found to be a programmable AUTOTROL® PERFORMA™ control valve produced by Pentair, Inc.

As shown herein, the valve 34 has three inlets, one being connected to the fresh water supply conduit 28 extending from the pump 14, another being connected to a salt water or brine supply conduit 36 extending from the brine tank 26, and still another being connected to the top portion 38a of a riser tube 38 that is partially buried in the exchange media 32 and extending upwardly from the bottom of the tank 30.

The valve 34 also has three outlets, one being connected to a household service conduit 40, another being connected to a drain conduit 42, and still another being connected to a first opening 30c or spout 44 that opens into the top of the tank 30.

The control valve 34 is electrically powered and is easily programmed. By programming the valve 34, a user may set the course of operation of the water softener 12 (and, to an extent, certain demands to be placed on the pump 14) in advance. The water softener 12 has five operating modes as is illustrated schematically in FIGS. 2-6. The timing and duration of the operating modes are established by a user based on a number of factors including: the initial level of hardness and $H_2S$ contamination of the water, the desired quality of the treated water, the type of exchange media 32 used in the softener 12, and the capacity of softener 12 to treat the water.

Figures 2, 3, 4:
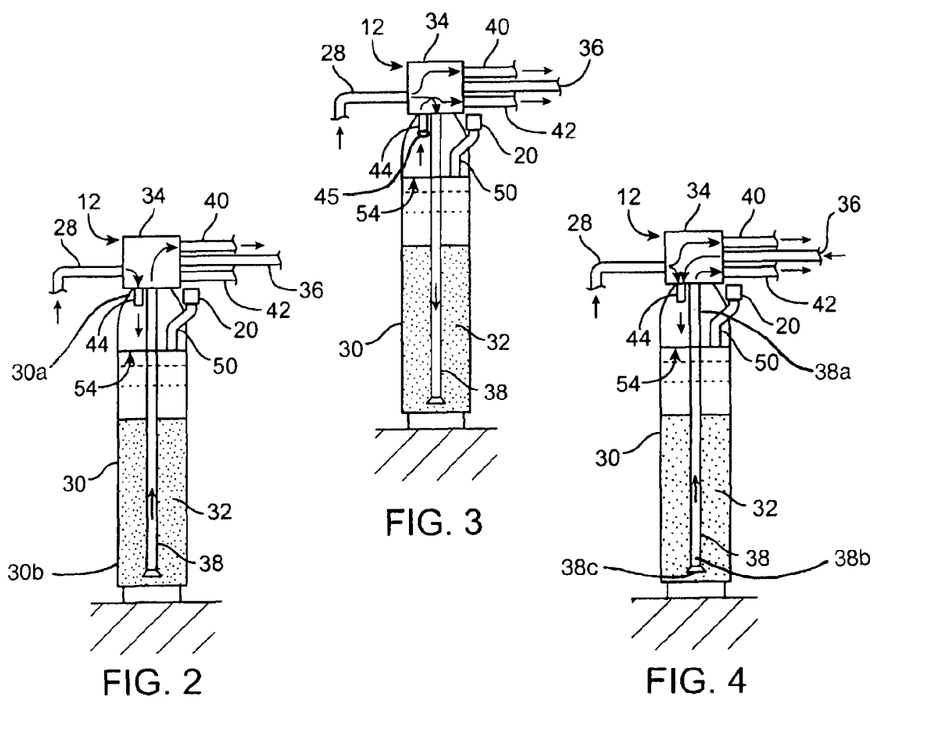
FIG. 2 is a schematic view of the water softener of FIG. 1 showing the direction of flow of water during normal service.
FIG. 3 is a schematic view of my water softener of showing the direction of flow of water during backwashing.
FIG. 4 is a schematic view of my water softener showing the direction of flow of water during brining and slow rinsing.

The service mode of operation of the water softener 12 is illustrated in FIG. 2. In the service mode, pressurized water from supply conduit 28 is directed by control valve 34 to spout 44. The water pours from the first tank opening 30c or spout 44 into the top of the tank 30.

It is important that the location of this first tank opening 30c be situated at a sufficient distance above the tank's air-water interface 54 so as to provide a drop height for the pressurized water to fall before it contacts the water that is already standing in the bottom of the tank. This drop height is necessary to provide ample time as the water falls for adequate mixing to occur at the water's free surface so allow for the adequate degassing of dissolved $H_2S$ from the water. This yields the requirement that the tank's first opening be located proximate the very top portion of the water softening tank.

If excessive amounts of dissolved $H_2S$ are found in the water, a means for generating a spray from the water entering the water softening tank can be placed in this first tank opening 30c or spout 44 and configured so as to cause the aerated, pressure water to enter the softening tank 30 as a spray of water droplets whose total surface area is maximized so as to yield in this resulting spray the final optimum degassing of the dissolved hydrogen sulfide from the aerated, pressurized water supply. This means can take the form of, for example, a spray nozzle 45 or a fluidic oscillator. The water is then allowed to collect and slowly percolate down through the exchange media 32.

After passing through the exchange media 32, the water passes into an orifice 38c in the bottom 38b portion of the riser tube 38. From the riser tube 38, the now-treated water is directed by the valve 34 into the household service conduit 40. By selectively opening tap 22 at the terminal end of the conduit 40, a user can draw off soft water, free of calcium and magnesium ions (and $H_2S$ as will be made clear herein below) for use in drinking, laundering, bathing, dishwashing, etc.

The rejuvenation of the exchange media occurs over four phases or modes of operation: backwash, brine rinse, fast water rinse or flush and refill. The backwash mode of operation of the water softener 12 is illustrated in FIG. 3. In the backwash mode of operation, the control valve 34 receives pressurized aerated water from the supply conduit 28 and splits the flow, directing some of the water into the top of the riser tube 38 and directing the remainder of the water into the household service conduit 40 to maintain a supply of water, although an imperfect one, to a user. The water in the riser tube 38 exits its orifice 38c and passes upwardly through the exchange media 32 dislodging precipitated oxide particles and other collected sediments. It should be noted that the aerated nature of the water is beneficial during mode of operation as it helps to enhance the mixing by providing "air fluffing" in the resin that helps top provide a better and more thorough cleaning of the resin. Water carrying suspended particulate matter is now directed by valve 34 from the top of the riser tube 38 into the drain conduit 42 for diversion into a sewer or septic system.

The brine/slow rinse mode of operation of the water softener 12 is illustrated in FIG. 4. In the brine/slow rinse mode of operation, the control valve 34 receives pressurized water from the supply conduit 28. Some of this water is directed by valve 34 into the household service conduit 40 to maintain a supply of water for a user. The remainder of the water received from the conduit 28 is mixed with brine that is permitted to enter the valve 34 from the salt water supply conduit 36. The mixed, salty water is diverted by the valve 34 to the spout 44 from which it pours into tank 30. The salty water percolates down through the exchange media 32, regenerating the exchange media 32, and is collected into the orifice at the bottom of the riser tube 38. From the riser tube 38, the salty water is directed by the valve 34 into the drain conduit 42.

Figure 5:
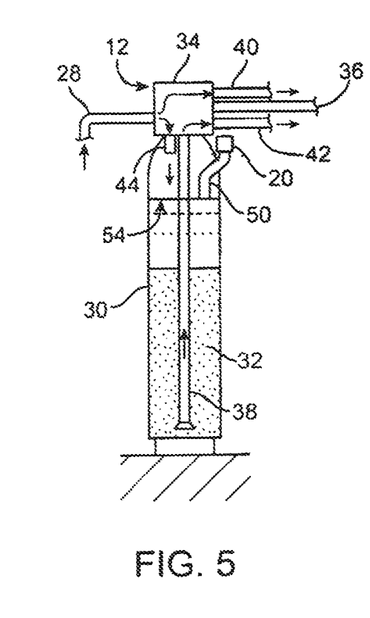
FIG. 5 is a schematic view of my water softener of showing the direction of flow of water during fast rinsing.

The fast rinse or flush mode of operation of the water softener 12 is illustrated in FIG. 5 and encompasses a final flush of the exchange media 32 to remove any salty water that may remain there. During a fast rinse, the control valve 34 receives pressurized water from the supply conduit 28 and sends some to the household service conduit 40 and some to the spout 44 for delivery into the tank 30. This water percolates through the exchange media 32, mixing with and carrying away any remaining brine. Then, the water passes through the riser tube 38 and is sent by valve 34 into the drain conduit 42.

During all modes of operation of this rejuvenation process, considerable mixing occurs at the water—air interface 54. This interface mixing creates the opportunity for considerable amounts of dissolved $H_2S$ to come out of solution and to immediately be vented from the tank's top portion. This provides the somewhat unexpected benefit that the concentrations of oxidized $H_2S$ residing in the tank's top portion attain their minimal values immediately after a rejuvenation cycle. Thus, the efficiency of the degassing of dissolved $H_2S$ from the aerated water coming into the tank's top portion reaches its maximum values immediately after a rejuvenation cycle. This may help to explain why the present invention is able to apparently remove more dissolved $H_2S$ from aerated water than the normal aeration technique of using an aspiration valve and an aeration tank downstream of the aspiration valve.

A further improvement of the present invention's ability to remove dissolved $H_2S$ comes about by its use of aerated water. The porous nature of the water softener resin results in more oxygen being captured in the resin's pores as aerated water flows through the resin. This additional oxygen content in the resin then serves to increase the amount of oxidation that is occurring in the tank as dissolved $H_2S$ and ferrous iron are removed from the water that is being treated in the water softener tank.

Figure 6:
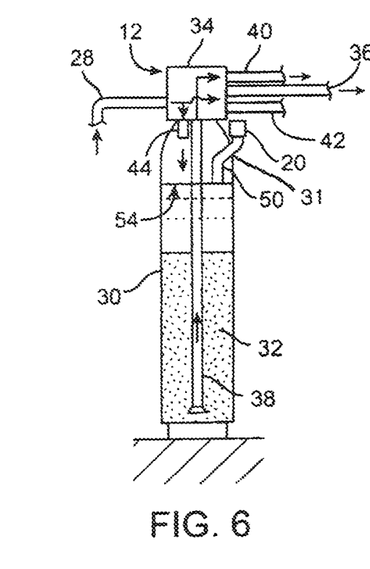
FIG. 6 is a schematic view of my water softener of showing the direction of flow of water during refilling of the brine tank.

The refill mode of operation of the water softener 12 is illustrated in FIG. 6. The refill mode is substantially identical to the service mode summarized with respect to FIG. 2. There is one difference, however, and that involves a diversion by the control valve 34 of some water from supply conduit 28 to the salt water supply conduit 36. The water entering the conduit 36 passes into the brine tank 26 to become saturated with salt, usually NaCl, which should be present in the brine tank 26 because of periodic resupply by the user. The saturated brine is later withdrawn from the brine tank 26 when the water softener 12 is operating in the brine/slow rinse mode to regenerate the exchange media 32.

Water and air flow from the well tank 24 back into the supply conduit 28 for delivery to the water softener 12. When the control valve 34 is operating, the water softener 12 in its service mode, water and air, pressurized by the pump 14 and delivered from the well tank 24, spill from the spout 44 into the tank 30. The water moves under the influence of gravity to the bottom of the tank 30 and air moves to the top of the tank 30. The agitation of the water caused as it falls through the air-filled top of the tank 30, promotes the oxidation of $H_2S$ dissolved within the water and the uptake of $H_2S$ into the air. The water is subsequently drawn through the exchange media 32 and into the riser tube 38 as previously described.

When the water level or air pressure increases sufficiently in the tank 30, it triggers the valve 20 to open and release $H_2S$ mixed with the excess air. Thus, the softener 12 simultaneously softens water and removes the taste and smell of sulfur.

The valve 20 is connected by a valve pedestal 50 to the water softener tank 30. The pedestal 50 is a tubular conduit that screws into an internally threaded second opening 31 in the sloping top wall of the tank 30 and that supports the valve 20 in an upright position. The pedestal 50 also sets the height of the air/water contact 54 within the tank 30 at a desired location above the exchange media 32.

Figure 7:
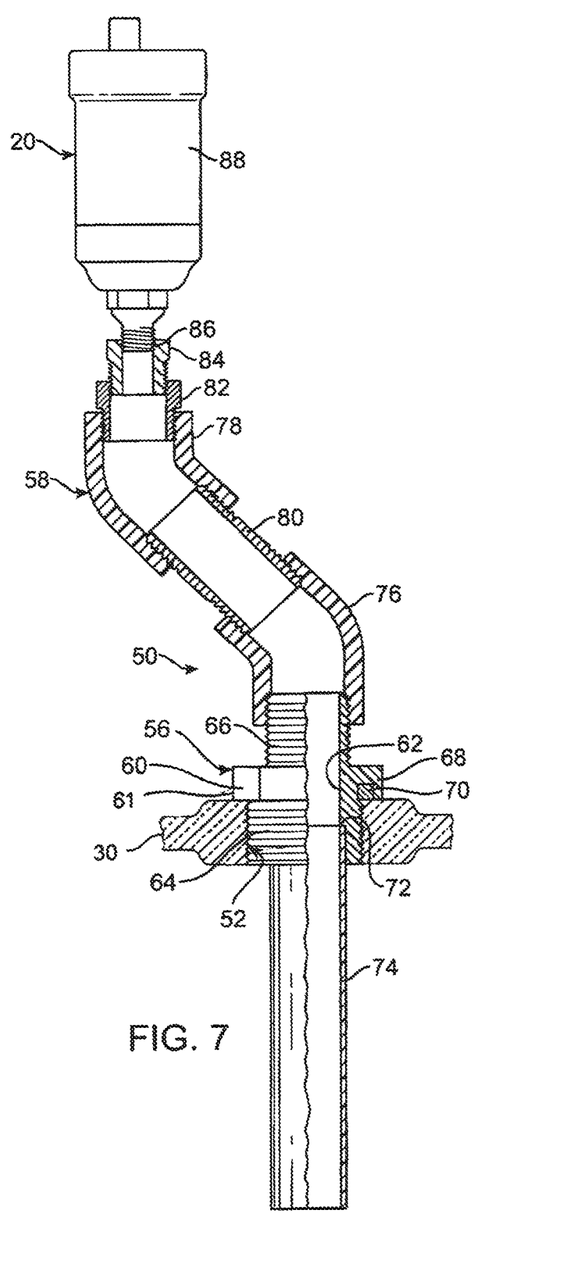
FIG. 7 is a partial cross-sectional view of the vent assembly of my water softener.

The valve pedestal 50 of FIG. 7 includes a dome hole adapter or adapter 56 that is screwed into the tank's second opening. This adapter 56 has top 66, middle 61 and bottom 64 portions and a passage 62 that extends between the top and bottom portions and is configured to allow for fluid flow through the adapter. The adapter passage's intersections with the bottom and top portions form respective a inlet and an outlet for the passage. The adapter's middle portion has an outer surface 52 that is configured so as to provide a water-tight seal between the tank's second opening and the adapter middle portion's outer surface.

A coupling 58 screws into the top of the adapter 56. The coupling 58 permits the positioning of the valve 20 to be carefully adjusted and finely varied. As will be seen, establishing an upright position for valve 20, away from the conduits 28, 36, 40 and 42 radiating from control valve 34, is important.

The adapter 56 also includes a polygonal fitting 60 of hexagonal outline whose six sides can be gripped by a wrench (not shown) for rotating the adapter 56 during its installation on the softener tank 30. The adapter 56 has a hole 62 extending through its center. An externally threaded sleeve or bottom portion 64 is integrally formed with the adapter 56 and extends downwardly from the bottom of the adapter 56 around the hole 62. Another externally threaded sleeve or top portion 66, having both a smaller outer diameter and a smaller inner diameter than that of the sleeve 64, is integrally formed with the adapter 56 and extends upwardly from the top of the adapter 56 around the hole 62. The hole 62 places the interiors of sleeves 64 and 66 in fluid communication with one another.

The adapter 56 joins the softener tank 30 to the coupling 58. The sleeve 64 is adapted to be snugly, yet releasably, screwed into the second opening in the tank 30. The sleeve 66 is adapted to be similarly screwed into the coupling 58. To ensure a watertight fit with the tank 30, the bottom of the fitting 60 is provided with a channel 68 that encircles the sleeve 64. A rubber O-ring 70 is positioned in the channel 68 and seats against the tank 30 to prevent leaks when the adapter 56 is screwed into place.

The inner diameter of the sleeve 66 is the same as the diameter of the hole 62 in the fitting 60. Thus, the fitting 60 and the sleeve 66 together form a smooth internal flow passageway.

The inner diameter of the sleeve 64 is somewhat larger than the diameter of the hole 62. So, a shoulder 72 is formed at the junction between the polygonal fitting 60 and the sleeve 64. The shoulder 72 serves as a stop to the upward movement of an extension of the adapter's bottom portion or a downcomer 74 inserted into the sleeve 64 from below. The downcomer 74 is affixed within the sleeve 64 and the positioning of the open bottom end of the downcomer 74 establishes the height of the air/water contact 54 in the softener tank 30. A long downcomer 74 places the air/water contact 54 low in the tank 30 and a short downcomer 74 sets the air/water contact 54 high in the tank 30.

The downcomer length that a user should select depends on numerous factors. Generally, a lower-situated air/water contact surface 54 made by a longer length downcomer 74 provides a greater volume of air in the softener tank 30 to oxidize $H_2S$ and is preferable in dealing with severe $H_2S$ problems (i.e., when the length of the adapter bottom portion is such that the volume of the top portion of the water softening tank is in the range of 10%-25% (see below), for sever $H_2S$ problems the downcomer's length is such that the volume of the top portion of the water softening tank is in the top part of this cited range and where 17.5% is clearly seen to be the midpoint of this range and to divide this range into a top and a bottom part). On the other hand, a higher-situated air/water contact 54 afforded by a shorter length downcomer 74, offers more space within the tank 30 to place the exchange media 32 in contact with water. A greater volume of exchange media 32 is preferable in tackling the problem of extremely hard water (i.e., when the length of the adapter bottom portion is such that the volume of the top portion of the water softening tank is in the range of 10%-25% (see below), for an extremely hard water problem the downcomer's length is such that the volume of the top portion of the water softening tank is in the bottom part of this cited range).

From experimentation, it was found that an optimal length for the adapter bottom portion or downcomer is such that the volume of the top portion of the water softening tank is in the range of 10%-25% of the water softening tank's total interior volume (wherein a short and a long downcomer are, respectively, in the lower and top part of this range), and more preferably in the range of 13%-20% of the water softening tank's total interior volume. For a 16 gallon capacity water softening tank having a diameter of 10 inches and a height of 54 inches, a downcomer having a length in the range of 4-8 inches has been found to be suitable for creating a tank top portion where adequate mixing can occur to remove moderate levels of dissolved $H_2S$ from pressurized, aerated water.

The coupling 58 is a chain of screwed-together fittings formed of polyvinyl chloride (PVC). The coupling 58 includes a pair of 45 degree elbows 76, 78 connected together by a nipple 80. The lower 45 degree elbow 76 is screwed onto the sleeve 66 of the adapter 56. An outside head bushing 82 is screwed into the upper 45 degree elbow 78. A second, outside head bushing 84 is screwed into the first outside head bushing 82. The fittings 76-84 are in fluid communication with one another and, when connected to the adapter 56, provide a path for air to flow from the interior of softener tank 12 to the atmosphere.

Figure 8:
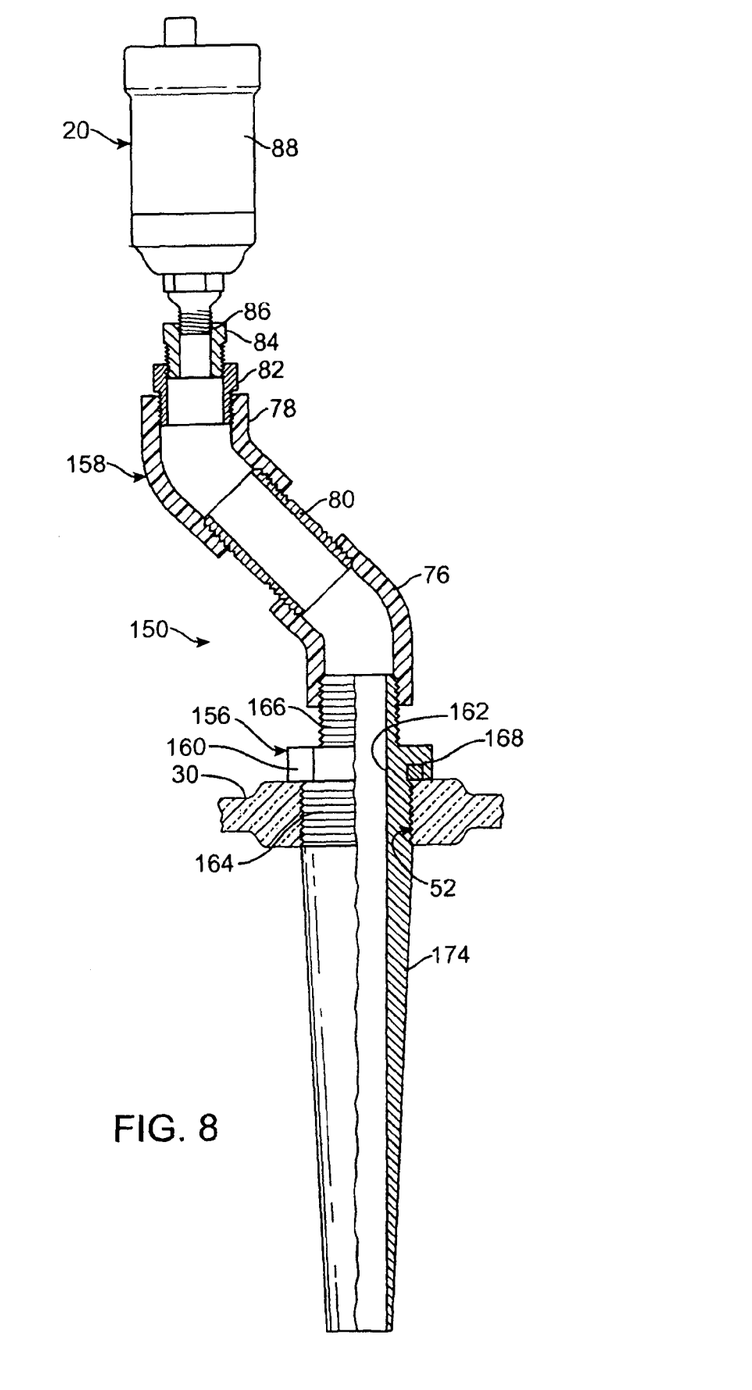
FIG. 8 is a partial cross-sectional view of an alternate vent assembly for my water softener.

FIG. 8 shows a valve pedestal 150 employing an alternate adapter 156. This adapter 156 includes a polygonal fitting 160 with a hole 162 extending through its center. An externally threaded sleeve 164 is integrally formed with the fitting 156 and extends downwardly from the bottom of the fitting 156 around the hole 162. Another externally threaded sleeve 166, having both a smaller outer diameter than that of the sleeve 164, is integrally formed with the fitting 156 and extends upwardly from the top of the fitting 156 around the hole 162. The hole 162 places the interiors of sleeves 164 and 166 in fluid communication with one another.

The adapter 156 joins the softener tank 30 to a variable coupling 158 that is similar to coupling 58. The sleeve 164 is adapted to be snugly, yet releasably, screwed into the tank's second opening. The sleeve 166 is adapted to be similarly screwed into the coupling 158. To ensure a watertight fit with the tank 30, the bottom of the fitting 160 is provided with a channel 168 that encircles the sleeve 164. A rubber O-ring 170 is positioned in the channel 168 and seats against the tank 30 to prevent leaks when the adapter 156 is screwed into place.

The sleeve 164 is provided with a conical, downward extension, i.e., a downcomer 174. As shown in FIG. 8, downcomer 174 is integrally formed with the sleeve 164. The wall thickness of the downcomer 174 smoothly varies from its top to its bottom. The inner diameter of the downcomer 174 is the same as that of the sleeve 164 for smooth flow through the adapter 156. Of course, all of the dimensions of the adapter 156 can be changed as a matter of design choice.

Figure 9:
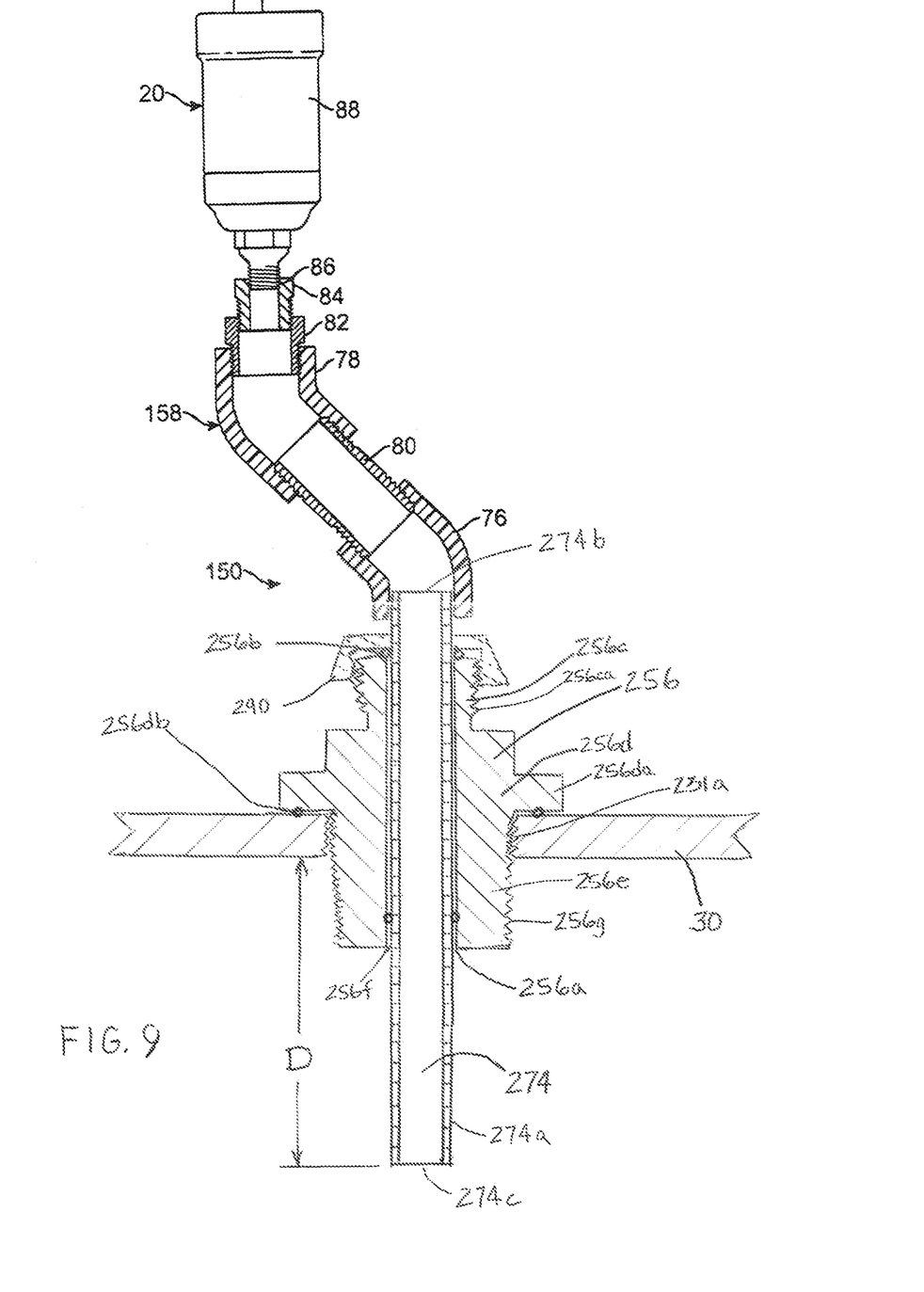
FIG. 9 is a partial cross-sectional view of an alternate downcomer pipe assembly for my water softener.

FIG. 9 shows an alternative, preferred version of the adapter 256 and downcomer pipe 274 of the present invention that is configured so as to provide for an easy change of the depth, D, where the bottom end of a downcomer pipe is situated in the water softening tank, and thus where the intersection between the top and bottom portions of the water softening tank is located.

The adapter 256 has an inlet 256*a* and an outlet 256*b* and top 256*c*, middle 256*d* and bottom 256*e* portions and a passage 256*f* that extends between the inlet and outlet and is configured to allow for gaseous flow through the adapter. The bottom portion of the adapter includes a threaded outer surface 256*g* that is configured to screw into and provide a water-tight seal between the threaded inner surface 231*a* of the second opening in the tank's wall and the threaded outer surface of the adapter's bottom portion. The middle portion of this adapter has a flange 256*da* that is configured to pull down against the adjoining top surface of the second tank opening when the outer surface of the adapter's bottom portion is screwed into the threaded inner surface of the second tank opening. This flange includes a compressible sealing member 256*db* that is compressed when the flange is pulled down against the adjoining top surface of the second tank opening to provide a water-tight seal between the flange and the adjoining top surface. The top portion of the adapter includes a threaded outer surface 256*ca*.

The downcomer pipe 274 shown in FIG. 9 has an outer surface 274*a* that is adapted to slidably fit within the adapter's passage 256*f*, with the downcomer pipe having top 274*b* and bottom 274*c* ends and a specified length, L, therebetween. This specified length is set so that when a portion of the downcomer pipe in situated in the adapter's passage, with the downcomer pipe's top end extending above the adapter's outlet, the downcomer pipe's bottom end extends downward into the water softening tank to a depth that thereby defines the intersection between said top and bottom portions of the water softening tank; thereby contributing to creating an air space in the tank's top portion that allows for sufficient mixing of the aerated, pressurized water with the air in the tank's top portion so as to treat the pressurized flow of water for its combination of problems. Because the downcomer pipe is at times slidable up and down in the adapter's passage, the downcomer pipe's bottom end can be temporarily set, at a specific point in time during the period of treating pressurized flow of water, at a first depth from among a range of adjustable depths in the water softening tank. This first depth is chosen according to the relative severity, at a specific point in time, of each of the problems in the combination of temporarily varying water problems being experienced in the flow of water.

To temporarily and adjustably set the depth of the downcomer pipe, a releasable, compression ring fitting 290 is used. It is configured: (a) to fit over and surround a portion of the top end of the downcomer pipe that extends above the adapter's outlet and to attach to the outer surface of the downcomer pipe and to the threaded outer surface of the adapter's top portion, (b) to temporarily lock the location of the top end of the downcomer pipe relative to the adapter and the tank's second opening so that the depth at which the bottom end of the downcomer pipe is set is the first depth which is appropriate for the relative severity, at a specific point in time, of each of the problems in the combination of temporarily varying water problems being experienced in the flow of water, and (c) when the relative severity has changed, at a later point in time, of each of the problems in said combination of temporarily varying water problems being experienced in said flow of water, to temporarily lock the location of the downcomer pipe relative to the adapter so that the depth at which the bottom end of the downcomer pipe is set at a second depth that is appropriate for the relative severity, at the later point in time, of each of the problems in the combination of temporarily varying water problems being experienced in the flow of water. This compression ring fitting 290 also has an O-ring situated proximate that portion of downcomer pipe's outer surface that passes through and is proximate the adapter's outlet; this O-ring is configured to provide a water tight seal between the downcomer pipe's outer surface and the adapter's outlet.

A suitable valve 20 for use with the present invention has been found to be a BRAUKMANN™ EA122A Automatic Air Vent made by Honeywell, Inc., of Morristown, N.J. Such a valve 20 has a threaded, tubular stem 86 extending downwardly from the bottom of a valve body 88. The stem 86 is screwed into the outside head bushing 84 and normally conveys air and water from the coupling 58 into the valve body 88. A float-actuated valve seat (not shown) within the valve body 88 selectively opens to release $H_2S$ contaminated air from the tank 30. When the air/water contact 54 is driven below the bottom of downcomer 74 by excess air in the tank 30, the excess air will pass through the valve pedestal 50 and into the valve body 88 in a manner that permits the float-actuated valve seat to open and release the bubble. Of course, other types of valves can be substituted for Honeywell's described above.

The brine tank 26 selectively supplies salt water to the water softener tank 30 for the purpose of regenerating the cation exchange media 32. Periodically, the brine tank 26 must be loaded with a water softener salt. Most commonly used for this purpose is NaCl in crystal or pelletized form. Rock grade salt should be 96.99 percent NaCl. Evaporated salt should be 99+ percent NaCl. Potassium chloride (KCl) can also be used in place of NaCl to minimize the amount of sodium added to both the softened water and the spent regenerant water delivered to the drain conduit—for disposal.

From the foregoing, it should be appreciated that water supply system 10 operates automatically. When the pump 14 is energized to deliver a pressurized stream of water into the supply conduit 28 when the water softener 12 is operating in its service mode, air enters the supply conduit 28 via the snifter valve 18. Oxygen in the air mixes with the pumped water and oxidizes any $H_2S$ dissolved in the water. $H_2S$, then, dissipates into the air pockets maintained in the well tank 24 and the top portion of the softener tank 30. Excess air containing $H_2S$ is vented from the softener tank 30 through the valve 20.

Compounds in the water that are yielding its hardness are pulled from the water by the exchange media 32 in the softener tank 30. Soft, $H_2S$-free water flows into service conduit 40 and is available on demand from tap 22. By operation of the control valve 34, the water softener 12 is backwashed, regenerated, rinsed and the brine tank refilled.

Once pump 14 pressurizes water from well 16, the supply system 10 does not require additional pumping steps to deliver pure water to a user. After aeration, the water flowing through the system 10 is not exposed to atmospheric contaminants. The oxygenation process is dependent on the mixing that at air-water interfaces that exist in the aerated water and that are created when the aerated water enters the top of the water softening tank.

While the water supply system 10 and the water softener 12 have been described with a high degree of particularity, it will be appreciated by those skilled in the water treatment field that modifications can be made to them. For example, it may be desirable to add check valves to the various conduits to prevent siphoning and backflow. Also, the flavor of water produced by the system 10 may be further enhanced by the addition of water filters containing activated carbon or other suitable filter media. Finally, if high concentrations of $H_2S$ are present in the produced water and the water softener 12 is being set up in a building, it may be desirable to install an air blower to vent produced air from the building to reduce odors. Therefore, it is to be understood that the present invention is not limited solely to water softener 12 described above, but encompasses any and all water softeners within the scope of the following claims.

Some key advantages of the dual-purpose device of the present invention are that it is relatively compact in size as compared to the aeration and softener tanks that might otherwise be used. It is also easier to operate, requires relatively minimal maintenance and its capital or investment cost is less than that of a system that has both water softener and aeration tanks.

Additionally, the use of aerated water in such a dual system has been found to yield the somewhat unexpected advantage of a more efficient and complete water softener resin rejuvenation process. This advantage can allow for more complete removal of dissolved $H_2S$ and ferrous iron are removed from the water, while also allowing for less frequent water softener backwashes and the resulting use of smaller amounts of well water and salt for softener resin rejuvenation purposes, thereby yielding lower water softener operating costs.

I claim:

1. A water softening and ferrous iron and hydrogen sulfide removal system, whose surrounding environment is air, for treating over a period of time a pressurized flow of water that has a combination of problems of temporarily varying severity chosen from the group of water problems including having a higher than desired level of hardness or a higher than desired concentration of dissolved ferrous iron or hydrogen sulfide, said system comprising:
 a well tank,
 a water softening tank having a tank wall and top and bottom portions that combine to define a specified interior volume for said water softening tank, and wherein said top portion having proximate the highest point in said top portion a first tank opening that is situated directly in said tank wall and serves as a tank inlet,
 a cation exchange media situated in said water softening tank and adapted to treat said water problem of having a higher than desired level of hardness,
 a conduit that is configured to bring water to and supply said flow of pressurized water through said first tank opening,
 a brine tank that contains a brine solution,
 a programmable control valve having a plurality of inlets and outlets and which is configured to regulate said flow of said pressurized water to and from said water softening tank and to allow for the periodic rejuvenation of said cation exchange media using said brine solution, and wherein said programmable control valve is situated in said first tank opening,
 a means configured to connect with said conduit at a location upstream of said well tank and introduce air from said surrounding environment into said pressurized flow of water through said means so as to yield a flow of pressurized, aerated water downstream from said means and through said system,
 a second tank opening that is situated in said top portion of said water softening tank and directly in said tank wall and distal from said first tank opening, said second tank opening having a threaded inner surface and an adjoining top surface,
 an adapter having an inlet and an outlet and top, middle and bottom portions and a passage that extends between said inlet and outlet and is configured to allow for gaseous flow through said adapter,
 wherein said bottom portion of said adapter includes said inlet and has a threaded outer surface that is configured to screw into and provide a water-tight seal between said threaded inner surface of said second opening of said tank wall and said threaded outer surface of said bottom portion of said adapter,
 wherein said middle portion of said adapter having a flange that is configured to pull down against said adjoining top surface of said second tank opening when said outer surface of said adapter bottom portion is screwed into said threaded inner surface of said second tank opening, and with said flange having a compressible sealing member that is compressed when said flange is pulled down against said adjoining top surface of said second tank opening to provide a water-tight seal between said flange and said adjoining top surface of said second tank opening,
 wherein said top portion of said adapter includes said outlet and has a threaded outer surface,
 a downcomer pipe having an outer surface that is adapted to slidably fit within said passage of said adapter, with said downcomer pipe having top and bottom ends and a specified length therebetween,
 wherein said specified length is set so that when a portion of said downcomer pipe is situated in said passage of said adapter, with said top end of said downcomer pipe extending above said outlet of said adapter, said bottom end of said downcomer pipe extends downward and below said inlet of said adapter and into said water softening tank to a depth that thereby defines an intersection between said top and bottom portions of said water softening tank and so as to contribute to creating an air space in said top portion of said water softening tank that allows for sufficient mixing of said aerated, pressurized water with said air in said top portion of said water softening tank so as to treat said pressurized flow of water for said combination of problems,
 wherein said specified length of said downcomer pipe is further adapted so as to allow said bottom end of said downcomer pipe to be temporarily set, at a specific point in time during said period for treating said pressurized flow of water, at a first depth from among a range of adjustable depths in said water softening tank, and with said first depth being chosen according to the relative severity, at said specific point in time, of each of the problems in said combination of temporarily varying water problems being experienced in said flow of water, and
 a releasable, compression ring fitting that is configured: (a) to fit over and surround a portion of said downcomer pipe that extends above said outlet of said adapter and to attach to the outer surface of said downcomer pipe and to said threaded outer surface of said top portion of said adapter, (b) to temporarily lock the location of said downcomer pipe relative to said adapter so that the depth at which the bottom end of said downcomer pipe is set at said first depth that is appropriate for the relative severity, at said specific point in time, of each of the problems in said combination of temporarily varying water problems being experienced in said flow of water, and (c) when the relative severity has changed, at a later point in time, of each of the problems in said combination of temporarily varying water problems being experienced in said flow of water, to temporarily lock the location of said downcomer pipe relative to said adapter so that the depth at which the bottom end of said downcomer pipe is set at a second depth different from said first depth and that is appropriate for the relative severity, at said later point in time, of each of the problems in said combination of temporarily varying water problems being experienced in said flow of water.

2. The water conditioning system as recited in claim 1, wherein:
   said first depth is such that the volume of said top portion of said water softening tank is in the range of 10%-25% of said specified interior volume of said water softening tank, and wherein said range is defined to have a midpoint of said range with a top and a bottom part of said range on either side of said midpoint of said range.

3. The water conditioning system as recited in claim 2, wherein:
   when, at a specific point in time during said period, the most severe of the water problem being experienced in said flow of water is having a higher than desired level of hardness, said first depth is set such that the ratio of the volume of said top portion of said water softening tank to the specified interior volume of said water softening tank is in said bottom part of the range of 10%-25%, and
   when, at a specific point in time during said period, the most severe of the water problem being experienced in said flow of water is a higher than desired concentration of dissolved hydrogen sulfide, said first depth is set such that the ratio of the volume of said top portion of said water softening tank to the specified interior volume of said water softening tank is in said top part of the range of 10%-25%.

4. The water conditioning system as recited in claim 3, wherein:
   said means is further configured so that a user of said system has the capability to adjust and control the volume flow rate of air to water in said flow of said pressurized, aerated water downstream from said means.

5. The water conditioning system as recited in claim 2, wherein:
   said means is further configured so that a user of said system has the capability to adjust and control the volume flow rate of air to water in said flow of said pressurized, aerated water downstream from said means.

6. The water conditioning system as recited in claim 1, further comprising:
   a valve configured to attach to said top end of said downcomer pipe and to operate between an open and a closed position so as to allow for said gaseous flow through said valve and into said surrounding environment.

7. The water conditioning system as recited in claim 6, wherein:
   said means is further configured so that a user of said system has the capability to adjust and control the volume flow rate of air to water in said flow of said pressurized, aerated water downstream from said means.

8. The water conditioning system as recited in claim 1, wherein:
   said means is further configured so that a user of said system has the capability to adjust and control the volume flow rate of air to water in said flow of said pressurized, aerated water downstream from said means.

9. The water conditioning system as recited in claim 1, wherein:
   said compression ring fitting is further configured to provide a water tight seal between said outer surface of said downcomer pipe and said outlet of said adapter.

* * * * *